United States Patent [19]
Searson et al.

[11] Patent Number: 5,733,683
[45] Date of Patent: Mar. 31, 1998

[54] ELECTROCHEMICAL STORAGE CELL CONTAINING AT LEAST ONE ELECTRODE FORMULATED FROM A FLUOROPHENYL THIOPHENE POLYMER

[75] Inventors: Peter Searson; Jeffrey Gilbert Killian; Haripada Sarker; Jennifer Giaccai; Yossef Gofer; Theodore O. Poehler, all of Baltimore, Md.

[73] Assignee: The Johns Hopkins University, Baltimore, Md.

[21] Appl. No.: 741,015

[22] Filed: Oct. 30, 1996

[51] Int. Cl.$^6$ .................................................. H01M 4/60
[52] U.S. Cl. .................... 429/213; 429/190; 429/194; 429/212
[58] Field of Search .......................... 429/213, 212, 429/190, 194, 192; 252/500, 182.1

[56] References Cited

U.S. PATENT DOCUMENTS

| | | |
|---|---|---|
| 4,442,187 | 4/1984 | MacDiamid et al. . |
| 4,522,901 | 6/1985 | Shacklette . |
| 4,532,195 | 7/1985 | Weddigen . |
| 4,535,039 | 8/1985 | Naarmann et al. . |
| 4,544,615 | 10/1985 | Shishikura et al. . |
| 4,728,589 | 3/1988 | MacDiamid et al. . |
| 4,740,436 | 4/1988 | Kobayashi et al. . |
| 4,801,512 | 1/1989 | MacDiamid et al. . |
| 4,804,594 | 2/1989 | Jow et al. . |
| 4,869,979 | 9/1989 | Ohtani et al. . |
| 5,132,049 | 7/1992 | Garreau et al. . |
| 5,151,162 | 9/1992 | Müller et al. . |
| 5,268,448 | 12/1993 | Buechner et al. . |
| 5,348,818 | 9/1994 | Asami et al. ........................ 429/213 |
| 5,460,905 | 10/1995 | Skotheim ............................ 429/213 |
| 5,470,677 | 11/1995 | Williams et al. . |
| 5,496,662 | 3/1996 | Andrieu et al. ..................... 429/213 |
| 5,510,438 | 4/1996 | Ferraris et al. . |
| 5,527,640 | 6/1996 | Rudge et al. . |

OTHER PUBLICATIONS

Kaneto, et al., "Characteristics of Polythiophene Battery", Japanese Journal of Applied Physics, vol. 22, No. 9, Sep., 1983, pp. L567–L568.

Kaneto, et al., "Optical and Electrical Properties of Electrochemically Doped n–and p–Type Polythiophenes", Japanese Journal of Applied Physics, vol. 23, No. 3, Mar., 1984, pp. L189–L191.

Rudge et al.; "A Study Of The Electrochemical Properties Of Conducting Polymers For Application in Electrochemical Capacitors", Electrochimica Acta, vol. 39, No. 2, pp. 273–287, 1994. No Month.

Rudge et al., "Conducting Polymers As Active Materials In Electrochemical Capacitors", Submitted To Journal Of Power Sources, pp. 1–24 (undated).

Yu et al., "Enhanced electroluminescence from semiconducting polymer blends", Synthetic Metals 72 (1995), pp. 249–252. No Month.

Reynolds, et al., "Electrochromic Polymers and Devices Via Electropolymerized Low Potential Monomers", Department of Chemistry, p. 135 (undated).

Roncali, "Conjugated Poly(thiophenes): Synthesis, Functionalization, and Applications", Chem. Rev. 1992, vol. 92, pp. 711–738. No Month.

(List continued on next page.)

*Primary Examiner*—Anthony Skapars
*Attorney, Agent, or Firm*—Cushman Darby & Cushman Intellectual Property Group of Pillsbury Madison & Sutro

[57] ABSTRACT

An electrochemical storage cell or battery including as at least one electrode at least one electrically conductive polymer, the polymer being poly (3(2-fluorophenyl) thiophene), poly(3(3-fluorophenyl) thiophene), poly(3(2,4-fluorophenyl) thiophene), poly(3(3,4-difluorophenyl) thiophene), poly(3(3,5-difluorophenyl) thiophene), or poly (3(3,4,5-trifluorophenyl)thiophene). These polymeric electrodes have remarkably high charge capacities, and excellent cycling efficiency. The provision of these polymeric electrode further permits the electrochemical storage cell to be substantially free of metal components, thereby improving handling of the storage cell and obviating safety and environmental concerns associated with alternative secondary battery technology.

22 Claims, 3 Drawing Sheets

OTHER PUBLICATIONS

Sato et al., "Electrochemical Preparation of Highly Anode–active Poly(3–phenylthiophene)", J. Chem. Soc., Chem. Commun., 1987, pp. 1725–1726. No Month.

Kaeriyama et al., "Structure And Properties of Polythiophene Derivatives", Synthetic Metals, 28 (1989) C611–C620. No Month.

Roncali et al., "New Electrogenerated Conducting Poly(thiophenes) containing Substituted Phenyl Groups", J. Chem. Soc. Chem. Commun., 1990, pp. 414–416. No Month.

Youssoufi et al., "Effects Of Electrosynthesis And Cycling Conditions On The Cation–Doping Of Poly(3–4–Fluoro–Benzyloxyethyl)–Thiophene)", Synthetic Metals, 41–43 (1991) p. 2916. No Month.

Lemaire, et al., "Design And Synthesis Of Polythiophene Containing Phenyl Substituents", New J. Chem., 1990, 14, pp. 359–364. No Month.

Gritzner et al., "International Union Of Pure And Applied Chemistry", Pure & Appl. Chem., vol. 54, No. 8, 1982, pp. 1527–1532. No Month.

Dimagno, et al., "Facile Elaboration of Porphyrins via Metal–Mediated Cross–Coupling"; J. Org. Chem. 1993, 58, pp. 5983–5993. No Month.

Hayashi et al., "Dichloro[1,1'–bis(diphenylphosphino) ferrocene]palladium–(II): An Effective . . . Halides", J. Am. Chem. Soc., 1984, 106, pp. 158–163. No Month.

Wu et al., "Preparation of 3–Thienylzinc and magnesium Halide via Oxidative Addition of . . . 3–Iodothiophene", J. Org. Chem. 1995, 60, pp. 6658–6659. No Month.

Garcia et al., "Effect of End Substitution on Electrochemical and Optical Properties of Oligothiophenes", J. Phys. Chem. 1993, 97, pp. 513–516. No Month.

Lacroix, et al., "Substituted Aniline Electropolymerization: Experimental Results And Frontier Orbital Interpretation", New Journal Of Chemistry, vol. 14, No. 2–1990, pp. 87–96. No Month.

Waltman, et al., "Substituent Effects In The Electropolymerization Of Aromatic Heterocyclic Compounds", J. Phys. Chem. 1984, 88, pp. 4343–4346. No Month.

Fujita et al., "The Analysis of the Ortho Effect", Department of Agricultural Chemistry, pp. 49–89 (undated).

Charton, "The Quantitative Treatment of the Ortho Effect", Department of Chemistry, School of Engineering and Science, Pratt Institute, Brooklyn, New York, pp. 234–305. No Date.

Chiang et al., "Electrical Conductivity in Doped Polyacetylene", Physical Review Letters, vol. 39, No. 17, Oct. 24, 1977, pp. 098–100, 1101 (undated).

Braun et al., "Visible light emission from semiconducting polymer diodes", Appl. Phys. Lett. vol. 58, No. 18, 6 May 1991, pp. 982–984.

Halls et al., "Efficient photodiodes from interpenetrating polymer networks", Nature, vol. 376, 10 Aug. 1995, pp. 498–500.

Wrighton, "Surface Functionalization of Electrodes with Molecular Reagents", Science, vol. 231, pp. 32–27 (1986). No Month.

Chidsey et al., "Electroactive Polymers and Macromolecular Electronics", Articles, Science, vol. 231, pp. 25–31 (1986). No Month.

Granstrom et al., "Micrometer–and Nanometer–Sized Polymeric Light–Emitting Diodes", Science vol. 267, 10 Mar. 1995, pp. 146–148.

Curtis et al., "Fabrication of Conducting Polymer Interconnects", Science, vol. 262, 24 Dec. 1993, pp. 2014–2016.

Garnier et al., "All–Polymer Field–Effect Transistor Realized by Printing Techniques", Science, vol. 265, 16 Sep. 1994, pp. 1684–1686.

Oyama et al., "Dimercaptan–polyaniline composite electrodes for lithium batteries with high energy density", Nature, vol. 373, 16 Feb. 1995, pp. 598–600.

Maxfield et al., "Composite Electrods Containing Conducting Polymers and Li Alloys", Electrochemical Science and Technology, vol. 135, No. 2, Feb. 1988, pp. 299–305.

Scrosati, "Electrode and Electrolyte Materials for Polymer–Based Lithium Batteries", J. Electrochem Soc., vol. 136, No. 10, Oct. 1989, pp. 2774–2782.

Evans, "The Electrochemistry of Conducting Polymers", Advances in Electrochemical Science and Engineering, vol. 1, pp. 1–74 (undated).

Bittihn et al., "Polypyrrole As An Electrode Material For Secondary Lithium Cells", pp. 51–59 (undated).

Osaka et al., "Dependence of Film Thickness on Electrochemical Kinetics of Polypyrrole and on Properties of Lithium/Polypyrrole Battery", J. Electrochem. Soc.: Eletrochemical Science and Technology, vol. 134, No. 9, Sep. 1987, pp. 2096–2102.

Armand, "Polymer Electrolytes", Ann. Rev. Mater. Sci. 1986, vol. 16, pp. 245–261. No Month.

Brandt, "Historical development of secondary lithium batteries", Solid States Ionics vol. 69, (1994), pp. 173–183. No Month.

ELECTROCHEMICAL STORAGE CELL CONTAINING AT LEAST ONE ELECTRODE FORMULATED FROM A FLUOROPHENYL THIOPHENE POLYMER

BACKGROUND OF THE INVENTION

1. Field of the Invention

The present invention relates to a battery or electrochemical storage cell, in particular a secondary cell, containing at least one electrode prepared from at least one electrically conductive and electrochemically oxidizable and/or reducible polymer. The battery or electrochemical storage cell of the present invention can be at least substantially free, or completely free, of metal components.

2. Description of the Related Art

Since the discovery that polymeric materials, and in particular polyacetylene, could be reversibly doped and undoped and thus employed as electrode materials for charge storage applications, much consideration and investigation has been directed towards employing polymers in a wide variety of electrical and electronic device applications, including energy storage (R. B. Kaner et al., J. Phys. Chem., 90, 5102 (1989); K. Kaneto et al. Japn. J. Appl. Phys., 22, L567 (1983)), light emitting diodes (D. Braun et al., Appl. Phys. Lett., 58, 1982 (1991); J.J.M. Halls et al. Nature, 376, 498 (1995); M. Granstrom et al., Science, 267, 1479 (1995)), sensors (J. W. Thackeray et al., J. Phys. Chem., 89, 5133 (1985); G. Fortier et al., Biosensors and Bioelectronics, 5, 473 (1990); P. N. Bartlett et al., J. Electroanal. Chem., 224, 27 (1987)), and electrochromic devices (H. Yashima et al., J. Electrochem. Soc., 134, 46 (1987); M. Gazard, Handbook of Conducting Polymers, Vol. 1, ed. (1983)) .

The conductivity of neutral polymers can be dramatically increased by chemically doping the polymers in a controlled manner with electron acceptor and/or electron donor dopants. The term doping used in connection with conducting polymers refers to the partial oxidation (p-doping) or partial reduction (n-doping) of the polymer, combined with the associated transport of charge compensating dopant ions into or out of the polymer. Conducting polymers are characterized by their ability to be switched between a neutral (or insulating) state and one or more doped (conducting) state(s).

In charge storage applications, such as electrochemical secondary storage cells, electrode materials should be able to undergo multiple doping and undoping cycles with high utilization efficiency and chemical stability. In addition, the two electrode materials should have a high charge capacity and combine to exhibit a high cell voltage.

Polyacetylene, polypyrrole, polyaniline, polythienylene, and polythiophene are among the several polymers that have been investigated and drawn intense interest to date in connection with charge storage applications. When employed in an electrochemical storage cell construction, however, repeated doping and undoping during charging and/or discharge may cause degradation of the polymer. Accordingly, many polymers, such as polyacetylene, have been plagued by poor charge/discharge cycling characteristics (i.e., reversibility) due to inferior chemical and electrochemical stability. Moreover, the complete elimination of any metallic components or liquid phase electrolytes from these cell constructions containing these polymers has not been achieved. While improvement in charge capacity and reversibility has been reported in connection with the p-doping of poly(3(4-fluorophenyl)thiophene), this polythiophene derivative exhibits a marginal charge capacity and reversibility when n-doped.

Thus, while some progress has been made in understanding conduction mechanisms, electronic structure, doping characteristics, and optical properties in conductive polymers, there remains much need for improvement in order to develop polymeric electrodes for electrochemical storage cells that exhibit suitable charge capacities and reversibilities in both the n-doped and p-doped states and can be employed in commercial applications without the need for metallic components.

SUMMARY OF THE INVENTION

It is therefore an objective of the present invention to solve the aforementioned problems associated with the related art as well as other problems by providing an electrochemical storage cell containing electrode materials that can undergo multiple doping and undoping cycles with high cycling efficiency and chemical stability.

It is another objective of the present invention to provide an electrochemical storage cell containing polymeric materials adaptable for preparing anodes and cathodes having remarkably high charge capacities, and that, when used in combination, yield a high cell voltage.

It is yet another objective of the present invention to provide polymeric electrode materials that can be incorporated into an electrochemical storage cell without the provision of any, or at least substantially no, metallic components or metal ions and yet achieve an excellent cell voltage.

Still another objective of the present invention to is provide a construction for an electrochemical storage cell that permits the cell design to be lightweight and flexible and overcomes safety and environmental concerns associated with alternative secondary battery technology.

Guided by the aforementioned objectives, the present inventors synthesized a series of different fluorophenyl thiophene polymers by devising preparatory techniques to systematically vary the number and position of fluorine on the phenylthiophenes. As a result of this undertaking, the present inventors discovered that polymeric electrodes exhibiting remarkably improved charge capacities and reversibilities in both the n-doped and p-doped states could be achieved by preparing the electrodes from at least one electrically conductive polymer selected from the group consisting of:

poly(3(2-fluorophenyl)thiophene), poly(3(3-fluorophenyl)thiophene), poly(3(2,4-difluorophenyl)thiophene), poly(3(3,4-difluorophenyl)thiophene), poly(3(3,5-difluorophenyl)thiophene), and poly(3(3,4,5-trifluorophenyl)thiophene).

Accordingly, the present invention is directed to polymeric electrodes prepared from at least one of the foregoing fluorophenylthiophene polymers.

The present invention further relates to an electrochemical storage cell including at least one electrode prepared from at least one of the above-mentioned fluorophenylthiophene polymers. In a preferred embodiment of the invention, poly(3(3,4,5-trifluorophenyl)thiophene) is selected as the electrically conductive polymer of the anode, and poly(3(3,5-difluorophenyl)thiophene) is selected as the electrically conductive polymer of the cathode.

Optionally, a substantially metal-free cell can be constructed by providing non-metallic current collectors and supports, such as graphite current collectors and poly(tetrafluoroethylene) (TEFLON) supports. Moreover, the electrolyte can be prepared from a polymer gel film, such as poly(acrylonitrile) with tetrabutylammonium tetrafluoroborate salt in a propylene carbonate solvent.

Since the cells of the present invention can be fabricated from multiple polymer films, the cells are lightweight and flexible and do not have the safety and environmental concerns associated with conventional high performance batteries. The elimination of any metallic components or liquid phases provides a unique alternative for secondary battery technology.

Further, since the components of the cell of the present invention are both moldable into various shapes and flexible, the cell can be incorporated into a device as a lining, and therefore takes up much less space in the device. This feature makes the electrochemical cell of the present invention especially adaptable for application in battery-operated automobiles and satellites, and other compact devices.

The present invention still further relates to batteries containing the electrolyte storage cells of the present invention. The battery may be either of a single cell structure or a multi-layer cell structure, and can be practiced as a primary or secondary battery.

These and other objects, features, and advantages of the present invention will become apparent from the following detailed description when taken in conjunction with the accompanying drawings which illustrate, by way of example, the principles of the present invention.

BRIEF DESCRIPTION OF THE DRAWINGS

The accompanying drawings illustrate the present invention. In such drawings.

DESCRIPTION OF THE PREFERRED EMBODIMENTS

A detailed description of preferred embodiments of the present invention is provided below.

Figure 1:
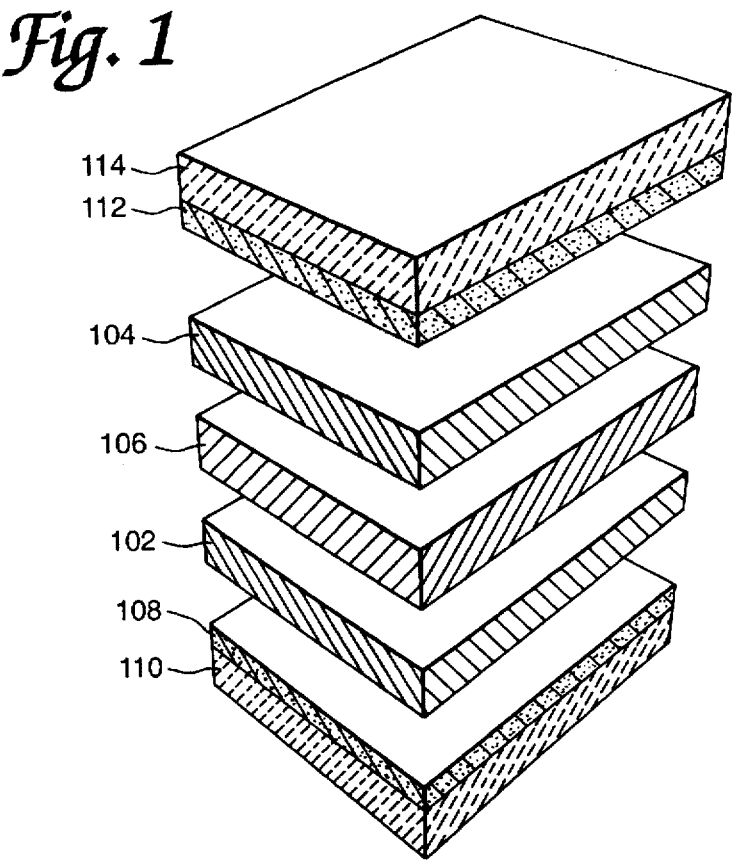
FIG. 1 is an exploded view of the construction of an electrochemical storage cell in accordance with an embodiment of the present invention.

An electrochemical storage cell according to one embodiment of the present invention, which is generally designated in FIG. 1 by reference numeral 100, includes a first electrode 102, a second electrode 104, and an electrolyte material 106 positioned therebetween and having opposing surfaces respectively interfacing with first surfaces (unnumbered) of the electrodes 102 and 104. The first electrode 102 contains a current collector 108 with support 110, the current collector 108 being disposed on a second surface (unnumbered) of the first electrode 102 opposing the first surface of the first electrode 102. These second electrode 104 also contains a current collector 112 with support 114, the collector 112 being disposed on a second surface (unnumbered) of the second electrode 104. The first electrode 102 can be designated as a positive electrode (cathode), and the second electrode 104 as a negative electrode (anode).

Although not illustrated in FIG. 1, a conventional liquid electrolyte can be provided as the electrolyte material 106. In such an arrangement, the cell can further include a diaphragm or separator (not shown) to separate the anode from the cathode. Porous or semipermeable polymeric or glass materials can be selected for preparing the separator.

In order to avoid gradual oxidation of the one or more electrically conductive polymeric electrodes and diminishment in the capacities of the cell or battery, the cell or battery should be closed in order to produce a substantially oxygen- and water-free state. Thus, the cell or battery should be enclosed in a hermetically sealed case (not shown) prepared from, for example, a metal or plastic or combination thereof.

The thickness of the first electrode 102 and the second electrode 104 greatly influence the overall capacity of the cell 100. For most practical applications, the electrodes 102 and 104 each generally have a thickness in the range of from about 10 nm to about 1 mm, and preferably in the range of from about 0.1 μm to about 100 μm.

The current collectors 108 and 112 can be prepared from a metallic substrate, including such elemental metals such as platinum, palladium, gold, silver, copper, titanium, and any combinations or alloys thereof, such as stainless steel. Alternatively, the current collectors 108 and 112 can be prepared from carbon, graphite, or carbon or graphite supported on a plastic film such as TEFLON, polyethylene, Kapton, or polyvinylenedifluoride. The current collectors 108 and 112 generally can have a thickness in the range of from about 100 nm to about 1 mm. In the case where carbon or graphite films serve as one or more of the current collectors 108 and 112, the film thickness of each collector 108 and 112 preferably is in the range of about 1 μm to about 10 μm. Where a metal or an alloy serves as one or more of the current collectors 108 and 112, each metal substrate generally will be self-supporting—i.e., not requiring supports 110 and 114—if the thickness of the metal or alloy substrate is at least about 5 μm. Practically, the metal or alloy substrate also can have a thickness in the range of from about 10 nm to about 1 mm.

The supports 110 and 114 are preferably defined by films prepared from tetrafluoroethylene polymers (TEFLON), and each can have a thickness in the range of from about 10 nm to about 1 mm, and preferably in the range of from about 10 μm to about 500 μm.

Where a electrolyte film gel is employed as the electrolyte material 106, the electrolyte film generally can have a thickness in the range of about 100 nm to about 1 mm, and preferably in the range of about 10 μm to 1 mm. The thickness of the film of electrolyte material 106 can be controlled by preparing the electrolyte by spin or dip coating.

In a preferred embodiment of the invention, the electrodes 102 and 104, the current collectors 108 and 112, and the electrolyte collectively provide for a thickness in the range of from about 50 µm to about 2 mm, and more preferably about 500 µm.

Figure 2A:
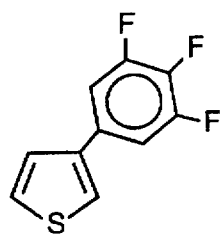
FIG. 2A is a schematic view representing the molecular structure of a 3(3,4,5-trifluorophenyl)thiophene monomer.
Figure 2B:
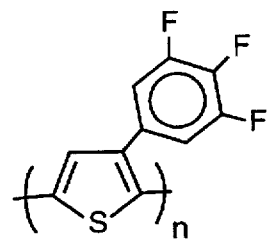
FIG. 2B is a schematic view representing an electrically conducting polymer having a backbone of 3(3,4,5-trifluorophenyl)thiophene.
Figure 3A:
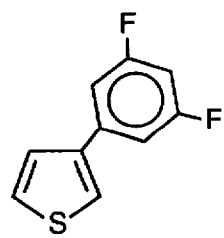
FIG. 3A is a schematic view representing the molecular structure of 3(3,5-difluorophenyl)thiophene monomer.
Figure 3B:
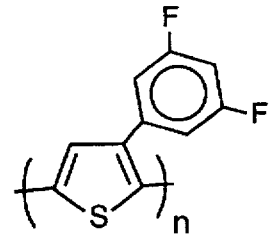
FIG. 3B is a schematic view representing an electrically conducting polymer having a backbone of 3(3,5-difluorophenyl)thiophene.

According to an embodiment of the present invention, at least one, and preferably both, of the first and second electrodes 102 and 104 are prepared from at least one electrically conductive fluorophenyl thiophene polymer selected from the group consisting of poly(3(2-fluorophenyl) thiophene), poly(3(3-fluorophenyl) thiophene), poly(3(2,4-difluorophenyl) thiophene), poly(3(3,4-difluorophenyl) thiophene), poly(3(3,5-difluorophenyl) thiophene), and poly(3(3,4,5-trifluorophenyl)thiophene). In a preferred embodiment, poly(3(3,5-difluorophenyl) thiophene), which is shown in FIG. 3B, is selected as the electrically conductive polymer of the cathode 106 since it exhibits high charge capacity in the p-doped state with good reversibility. The molecular structure of the fluorophenylthiophene monomer unit for preparing poly(3(3,5-difluorophenyl)thiophene) is shown in FIG. 3A. Poly(3(3,4,5-trifluorophenyl)thiophene) (FIG. 2B) is selected as the electrically conductive polymer of the anode 104 since it exhibits a high charge capacity in the n-doped state with good cyclibility. The molecular structure of the fluorophenylthiophene monomer unit for preparing poly(3(3,4,5-trifluorophenyl)thiophene) is shown in FIG. 2A. If only one of the electrodes 102 and 104 is prepared from the electrically conductive polyfluorophenyl thiophene of the present invention, the other electrode can be selected from another known polymer or metallic compound.

The monomers selected to prepare the fluoro-substituted phenylthiophene polymers can be synthesized by, for example, a coupling reaction between zinc complexes of various fluoro-substituted 1-bromophenyl reagents and commercially available 3-bromothiophene. This coupling reaction occurs in the presence of a [1,1-bis(diphenylphospheno) ferrocene] palladium(II)chloride ("Pd(dppf)Cl$_2$") catalyst, and preferably under nonaqueous conditions and in a dry argon atmosphere. This synthesis route provides for high isolated yields of 70% or higher.

Controlling the reaction time, temperature, and the fluoro-substituted 1-bromophenyl reagent of the coupling reaction mixture determines the extent of fluorination of the phenylthiophene. For example, 3(3,4,5-trifluorophenyl) thiophene, 3(3,4-difluorophenyl)thiophene, and 3(3,5-difluorophenyl)thiophene are prepared by allowing the coupling reaction to proceed for about 30 minutes at about 60° C. 3(2,4-difluorophenyl)thiophene, 3(2-fluorophenyl) thiophene, and 3(3-fluorophenyl)thiophene were prepared by allowing the coupling reaction mixture to reflux for 10, 2, and 0.75 hours, respectively. The completion of the coupling reaction was monitored by gas chromatography. Example procedures for preparing each of these fluorophenyl-substituted thiophenes are set forth below.

The polymeric films defining the electrodes 102 and 104 can be prepared by homopolymerizing the fluorophenyl-substituted thiophene monomers, or optionally can be prepared by copolymerizing blends of two or more fluorophenyl-substituted thiophene monomers or blends of one or more fluorophenyl-substituted thiophene monomers with one or more copolymerizable monomers. For example, suitable copolymerizable monomers include those monomers containing a conjugated ethylenically unsaturated bonds along their backbone, such as a thiophene monomer.

Suitable techniques for conducting the homo- or co-polymerization include the chemical route, for example in the presence of oxidizing agents, or by electropolymerization.

According to the chemical polymerization technique, a strong oxidizing agent is added to initiate the reaction. Exemplary oxidizing agents include, without limitation, Lewis acids such as ferric chloride (FeCl$_3$), molybdenum chloride (MoCl$_5$), and ruthenium chloride (RuCl$_5$), and oxidants such as copper chlorate [Cu(ClO$_4$)$_2$]. After polymerization is allowed to proceed in a suitable solvent, such as propylene carbonate, the polymer can be isolated in powder form. The powder can then be fashioned into any suitable form as the active electrode material. For example, the powder can be compressed into pellets, a self-supporting film, a supported sheet, or dispersed in a suitable carrier matrix, such as an organic polymeric material. The chemical polymerization can take place, for example, under ambient conditions. Isolation of the powder can be achieved by filtering or evaporating the solvent, or by other known techniques.

The preferred procedure for preparing the electrically conducting polymers of the present invention is electropolymerization. The electropolymerization is usually heterogenous insofar as it involves polymerizing the monomers on the conducting substrate to form a solid phase. Polymerization is initiated by applying an oxidizing potential across the substrate. The oxidizing potential applied across the substrate should be equal to or greater than the threshold polymerization potential of the monomer(s) in order to initiate polymerization. As referred to herein, the threshold polymerization potential is a threshold potential at which a current begins to flow across the polymerizable solution and the monomers begin to polymerize on the substrate. An external circuit with a current sensing meter can be utilized to determine when the current begins to flow. Alternatively, the threshold polymerization potential can be visually detected by formation of the polymer on the substrate, although some degree of polymerization must occur before visual detection is possible.

The polymerization potentials of the monomers of the present invention were found to be accessible in solvents such as propylene carbonate, resulting in the deposition of high quality films. The polymers can also be formed as powders, which can then be compacted to prepare the electrodes.

The temperature at which the electropolymerization is carried out is generally about room temperature, although temperatures ranging about 20° C. higher and 20° C. lower than room temperature can be employed. The electropolymerization can be carried out at atmospheric pressure.

Suitable substrates for the electropolymerization of fluorophenyl-substituted thiophene monomers include, by way of example, platinum, palladium, gold, silver, titanium, copper, stainless steel, and any combinations or alloys thereof. Carbon, graphite, conducting tin oxide, and polyethylene can also be selected as the substrate for the electropolymerization. These substrates can serve as the current collectors 108 and 112 of the cell 100; accordingly, electropolymerization can obviate the need for an additional preparatory step of transferring the polymeric electrodes 102 and 104 to the current collectors 108 and 112, respectively.

In addition, if desirable conventional additives such as graphite, carbon black, acetylene black, metal powder, or carbon fiber may be incorporated in the polymeric electrolyte of the present invention, although the electrodes are preferably prepared without such additives.

These secondary batteries may be either initially assembled in a charged state, or initially assembled in an uncharged state, and subsequently converted in situ to such charged state by means of electrochemical doping. Preferable, the cells are assembled in the fully neutralized state to ensure that the electrolyte concentration in the gel does not exceed the solubility limit in the fully discharged state during cycling, that is, to ensure that the electrolyte salt does not precipitate out during discharge of the cell.

For example, the electrochemical doping technique can be applied by charging the electrochemical cell 100 by connecting a direct current (DC) voltage source to the electrodes 102 and 104. In particular, the positive potential of the voltage source is applied to the polymeric electrode selected as the cathode, and a negative potential is connected to the polymeric electrode selected as the anode. The application of the positive potential to the neutral polymer selected as the cathode effects an increase in the oxidation state of the polymer by electron transfer from the polymer, imparting a net positive charge to the polymer. Consequently, the polymer forming the cathode attracts anions from the electrolyte 106 as counter ions to maintain the electrical neutrality in the polymer. On the other hand, application of the negative potential to the neutral polymer selected as the anode effects a decrease in the oxidation state of the polymer by electron transfer to the polymer, imparting a net negative charge to the polymer. Consequently, the polymer forming the anode attracts cations from the electrolyte 106 as counter ions to maintain the electrical neutrality in the polymer.

The doping level can be controlled by measuring the quantity of electricity flowing during charging of the cell or by measuring the voltage. Doping may be carried out under constant current or constant voltage conditions or under a varying current or varying voltage condition. The doping current, voltage, and time vary depending on the kind, bulk density, and area of the polymeric electrode, the electrolyte salt and solvent selected, and the desired temperature.

Alternatively, the polymers can initially be chemically doped with dopant species.

A practical charge storage device utilizing conducting polymers for both anode and cathode requires not only the selection of two materials that can be n-doped and p-doped, respectively, to provide adequate charge capacities, but also an electrolyte that is compatible with these materials. That is, the electrolyte salt and solvent selected should allow a sufficiently large potential range to attain the polymerization potential, as well as the full n-doped and p-doped states, of the polymers.

According to a preferred embodiment of the present invention, the electrolyte selected is an ionically conducting polymer gel. Exemplary cations for preparing the electrolyte salts that can be employed in accordance with the present invention include, without limitation, cations of tetraalkyl ammonium, sodium, lithium, potassium, silver, and magnesium. Exemplary anions for preparing the electrolyte salts suitable for the present invention include, without limitation, tetrafluoroborate ($BF_4^-$), hexafluoroarsenate ($AsF_6^-$), hexafluorophosphate ($PF_6^-$), hexafluoroantimonate ($SbF_6^-$), trifluoromethane sulfonate ($CF_3SO_3^-$), bistrifluoromethylsulfonyl imide or "imid salt" (($CF_3SO_2)_2N^-$), cyclic imid salt, perchlorate ($ClO_4^-$), thiocyanate ($SCN^-$), and iodide ($I^-$). For example, among the salts can be practiced with the present invention are the following: tetrabutylammonium hexafluorophosphate, lithium tetrafluoroborate, tetraethylammonium tetrafluoborate, tetrabutylammonium tetrafluoroborate, lithium perchlorate, tetrabutylammonium perchlorate, tetraethylammonium perchlorate, tetramethylammonium trifluoromethanesulfonate, and tetrabutylammonium hexafluorophosphate. Preferably, tetrabutylammonium tetrafluoroborate is selected as the electrolyte salt, since this salt has high solubility and electrochemical stability and provides good cycling efficiency for the conducting polymers.

Suitable electrolyte solvents include, by way of example, the following: ethers, such as tetrahydrofuran (THF), dimethoxyethane, dioxolane, 2-methyltetrahydrofuran, and diethyl ether; esters, such as γ-butyrolacetone, propylene carbonate, ethylene carbonate, dimethyl carbonate, diethyl carbonate, dibutyl carbonate, methyl formate, ethyl formate, ethyl acetate, and methyl acetate; nitrogen-containing compounds such as nitrobenzene, nitromethane, acetonitrile, benzonitrile, N,N-dimethylformamide, N,N-dimethylacetamide, nitroethane, and propylonitrile; sulfur-containing organic compounds, such as dimethylsulfoxide and sulfolane; and others such as dichloromethane and acetone. Preferably, propylene carbonate is selected as the electrolyte solvent.

Polymer gels are defined herein as mixed-phase materials with good ionic conductivity that can be solution cast into thin flexible films. The ability to solution cast the gel prior to gelation onto the electrodes ensures good contact between the polymer electrodes and the electrolyte film. Such casting can be performed by spin or dip coating, as well as other techniques known in the art. Optionally, the gel can be formed on a temporary substrate and transferred to the electrodes. Where the electrolyte is to prepared as a gelled film, suitable gelling agents that can be employed include: poly(ethyleneoxide), poly(propylene oxide), poly(vinylidenedichloride), poly(vinylsulfone), poly(vinylidenedifluoride), poly(2,2-dimethyltrimethylenecarbonate), poly(acrylonitrile), poly(vinylchloride), poly(ethyleneglycol), poly(propyleneglycol), poly(tetrahydrofuran), poly(dioxolane), poly(siloxanes), poly(ethoxyethoxyethoxyvinylether), poly(phosphazene), poly(methylmethaacrylate), poly(styrene), poly[bis(methoxyethoxy)phosphazene], poly(acrylic acid), poly(methylacrylate), poly(vinylformal), poly(vinylenecarbonate), poly(vinylacetate), poly(vinylpyrrolidone), poly(acrylamide), poly(ethoxy(proyleneglycol)acrylate), and others. Preferably, poly(acrylonitrile) is selected as the gelling agent.

The concentration of the electrolyte salt in the solvent depends upon the electrodes selected, the charging and discharging conditions, the operating temperature, and the specific electrolyte salt and solvent selected, and, therefore, is generally not defined. It is ordinarily preferred, however, that the concentration be about 0.1 to about 3M, and most preferably about 1.0M.

The charging of the electrodes is described above. In operation of the electrochemical cell, the electrodes are reversibly discharged. For example, the cell reactions during discharge of a cell containing a poly(3(3,4,5-trifluorophenyl)thiophene) anode, poly(3(3,5-difluorophenyl)thiophene) cathode, and tetrabutyl ammonium tetrafluoroborate in propylene carbonate electrolyte are as follows:

(1) anode: poly (3(3,4,5-trifluorophenyl)thiophene)$_n^-$.TBA$^+$→poly (3(3,4,5-trifluorophenyl)thiophene)$^0$+TBA$^+$ +e$^-$ (2) cathode: poly (3(3,5 difluorophenyl)thiophene)$_m^+$.BF$_4^-$+e$^-$→poly (3(3,5 difluorophenyl) thiophene)$^0$+BF$_4^-$ wherein TBA$^+$ represents a tetrafluoroborate cation, BF$_4^-$ represents a tetrabutylammonium anion, and n and m denote the number of monomer units.

As evident from these equations, in the charged state both electrodes are fully doped so that during discharge, the polymers are neutralized and the ion concentration in the electrolyte polymer gel increases as the charge compensating TBA⁺ and BF₄⁻ counter ions are ejected from the electrodes. Consequently, in order to optimize the cell electrochemical properties the minimum thickness of the gel film is determined by the solubility limit of the salt in the gel.

The electrochemical properties of the fluorophenyl thiophene polymers of the present invention, as well as those of poly(3(4-fluorophenyl)thiophene) as a comparative example, are summarized below:

charge capacity over poly(3(4fluorophenyl)thiophene). Poly (3(3,4,5-trifluorophenyl)thiophene) exhibited the highest charge capacity in the n-doped state, together with excellent electrochemical stability. Thus, in a preferred embodiment of the invention, poly(3(3,4,5-trifluorophenyl)thiophene) is selected as the electrically conductive polymer of the anode 104. On the other hand, poly(3,(3,5-difluorophenyl) thiophene) exhibited very high charge capacity and very high electrochemical stability in the p-doped state, and, therefore, was selected as the electrically conductive polymer of the cathode.

TABLE I

| Polyfluorophenyl-thiophenes | Anodic Charge Capacity (e/mu)$^a$ | Cathodic Charge Capacity (e/mu)$^a$ | Anode Charge Density (mAh/g)$^b$ | Cathode Charge Density (mAh/g)$^b$ | Anode Average stability per cycle (%) | Cathode Average stability per cycle (%) |
|---|---|---|---|---|---|---|
| poly(3(3,4,5-trifluorophenyl)thiophene) | 0.26 | 0.23 | 32.1 | 28.4 | 99.53 | 99.90 |
| poly(3(3,5-difluorophenyl)thiophene) | 0.26 | 0.21 | 35.2 | 29.0 | 98.37 | 99.92 |
| poly(3(3,4-difluorophenyl)thiophene) | 0.16 | 0.21 | 21.3 | 28.5 | 99.85 | 99.88 |
| poly(3(2,4-difluorophenyl thiophene) | 0.18 | 0.17 | 23.9 | 23.5 | 99.76 | 99.91 |
| poly(3(2-fluorophenyl)thiophene) | 0.15 | 0.18 | 22.6 | 26.8 | 99.80 | 99.94 |
| poly(3(3-fluorophenyl)thiophene) | 0.18 | 0.18 | 26.8 | 26.7 | 99.88 | 99.87 |
| poly(3(4-fluorophenyl)thiophene) | 0.10 | 0.20 | 14.8 | 30.6 | 99.88 | 99.87 |

| Polyfluorophenyl-thiophenes | Electropolymerization Potentials of the Monomers (V)$^c$ | Oxidation Peak Potentials (V)$^c$ of Polymers (n-dopings)$^d$ | Reduction Peak Potentials (V)$^c$ of Polymers (p-doping)$^d$ | Negative Voltage Limit (V)$^{c,d}$ | Positive Voltage Limit (V)$^{c,d}$ |
|---|---|---|---|---|---|
| poly(3(3,4,5-trifluorophenyl)thiophene) | 1.15 | −1.77 | 0.58 | −2.08 | 0.88 |
| poly(3(3,5-difluorophenyl)thiophene) | 1.15 | −1.87 | 0.63 | −2.13 | 0.88 |
| poly(3(3,4-difluorophenyl)thiophene) | 1.06 | −1.85 | 0.56 | −2.10 | 0.80 |
| poly(3(2,4-difluorophenyl)thiophene) | 1.10 | −1.83 | 0.54 | −2.10 | 0.80 |
| poly(3(2-fluorophenyl)thiophene) | 1.06 | −1.88 | 0.55 | −2.10 | 0.80 |
| poly(3(3-fluorophenyl)thiophene) | 0.98 | −1.99 | 0.52 | −2.10 | 0.80 |
| poly(3(4-fluorophenyl)thiophene) | 0.96 | −1.93 | 0.54 | −2.10 | 0.80 |

$^a$electron/monomer unit,
$^b$first cycle
$^c$vs. Ag⁺/Ag,
$^d$first cycle

As presented in TABLE I, each of the polymers of the present invention exhibited a remarkably superior anodic The following non-limiting example serves to explain the preparation of the fluoro-substituted phenylthiophene monomers and polymers, and the preparation and characteristics of an electrochemical cell containing such polymers, in more detail.

EXAMPLES (1) Synthesis of fluorophenylthiophene monomers (a) Synthesis of 3(3,4,5-trifluorophenyl)thiophene In a first three-necked round-bottom flask (100 ml), metallic magnesium (52 mmol) (product #25411-8, manufactured by Aldrich Chemical) was flame dried in an argon atmosphere for 3 to 4 minutes. Upon cooling under the argon atmosphere, 50 ml of freshly dried tetrahydrofuran (product #T 397-4, manufactured by Fisher Scientific) was previously distilled from a sodium/bentophenone mixture and directly drawn into the flask from the distillation head. Into this mixture of magnesium and tetrahydrofuran was added 1-bromo-3,4,5-trifluorobenzene (26 mmol) (product #33084-1, manufactured by Aldrich Chemical), which remained in an argon atmosphere and was stirred. After the mixture was warmed to about 40° C. (after about 3 to 4 minutes), the flask was cooled (e.g., via an ice bath) and continuously stirred for 2 hours to form a magnesium complex. Anhydrous zinc chloride ($ZnCl_2$) (31 mmol) (product #20808-6, manufactured by Aldrich Chemical) previously dried at 160° C. and weighed under vacuum conditions was added to the magnesium complex at room temperature. After stirring for 30 minutes, the zinc complex suspension was transferred (e.g., via Teflon tubing) under argon pressure to a second three-necked round-bottomed flask (250 mL) containing a solution of 3-bromothiophene (21 mmol) (product #10622-4, manufactured by Aldrich Chemical) and $Pd(dppf)Cl_2$ catalyst (product #37967-0, manufactured by Aldrich Chemical). This coupling reaction mixture was then heated (e.g., via an oil bath) for 0.5 hour with continuous stirring at 60° C.

The completion of the coupling reaction was monitored by gas chromatography using aliquot of reaction mixture after the work-up described below. When most of the 3-bromothiophene was consumed as determined by gas chromatography, the crude reaction mixture was worked-up as follows: The reaction mixture was quenched with 10 mL of 5 wt. % aqueous sulfuric acid at room temperature. After evaporating the tetrahydrofuran using a rotary evaporator, dichloromethane (40 mL) and water (40 mL) were added to the crude reaction mixture and extracted. The organic layer was washed three times with water, and then was dried over anhydrous sodium sulfate, followed by evaporation. An oily brown liquid resulted. Purification of the crude product was carried out by column chromatography using silica gel (stationary phase) and n-pentane (as an eluent). The crude product was initially absorbed on the silica gel (about 2 to 3 grams) and charged on the column. The net weight ratio of crude product to the silica gel stationary phase was about 50:1. Chromatographic resolution was checked periodically by using a silica gel thin layer chromatography plate (product #Z12278-5, manufactured by Aldrich Chemical) and n-pentane as the eluent. 3,4,5-trifluorophenylthiophene was further purified by crystallization from n-pentane at 0° C. to obtain a 98 to 99% pure product.

(b) Synthesis of 3(3,4-difluorophenyl)thiophene

The same procedures set forth above in Example (1)(a) for synthesizing 3(3,4,5-trifluorophenyl)thiophene were followed, with the exception that 1-bromo-3,4-difluorobenzene was substituted for 1-bromo-3,4,5-trifluorobenzene as the 1-bromo-substituted fluorobenzene.

(c) Synthesis of 3(3,5-difluorophenyl)thiophene

The same procedures set forth above in Example (1)(a) for synthesizing 3(3,4,5-trifluorophenyl)thiophene were followed, with the exception that 1-bromo-3,5-difluorobenzene was substituted for 1-bromo-3,4,5-trifluorobenzene as the 1-bromo-substituted fluorobenzene.

(d) Synthesis of 3(2,4-difluorophenyl)thiophene

The same procedures set forth above in Example (1)(a) for synthesizing 3(3,4,5-trifluorophenyl)thiophene were followed, with the exception that 1-bromo-2,4-difluorobenzene was substituted for 1-bromo-3,4,5-trifluorobenzene as the 1-bromo-substituted fluorobenzene, and the coupling reaction mixture was heated to reflux in an oil bath for 10 hours with stirring at 80° C. (as opposed to being heated in an oil bath for 0.5 hour with periodically stirring). No further purification by recrystallization was required to obtain a 97 to 98% pure product.

(e) Synthesis of 3(2-difluorophenyl)thiophene

The same procedures set forth above in Example (1)(d) for synthesizing 3(2,4-difluorophenyl)thiophene were followed, with the exception that 1-bromo-2-fluorobenzene was substituted for 1-bromo-2,4-difluorobenzene as the 1-bromo-substituted fluorobenzene, and the coupling reaction mixture was heated to reflux in an oil bath for 2 hours with stirring at 80° C. No further purification by recrystallization was required to obtain a 97 to 98% pure product.

(f) Synthesis of 3(3-difluorophenyl)thiophene

The same procedures set forth above in Example (1)(d) for synthesizing 3(2,4-difluorophenyl)thiophene were followed, with the exception that 1-bromo-3-fluorobenzene was substituted for 1-bromo-2,4-difluorobenzene as the 1-bromo-substituted fluorobenzene, and the coupling reaction mixture was heated to reflux in an oil bath for 0.75 hours with stirring at 80° C.

(2) Preparation of electrolyte gel

Figure 5:
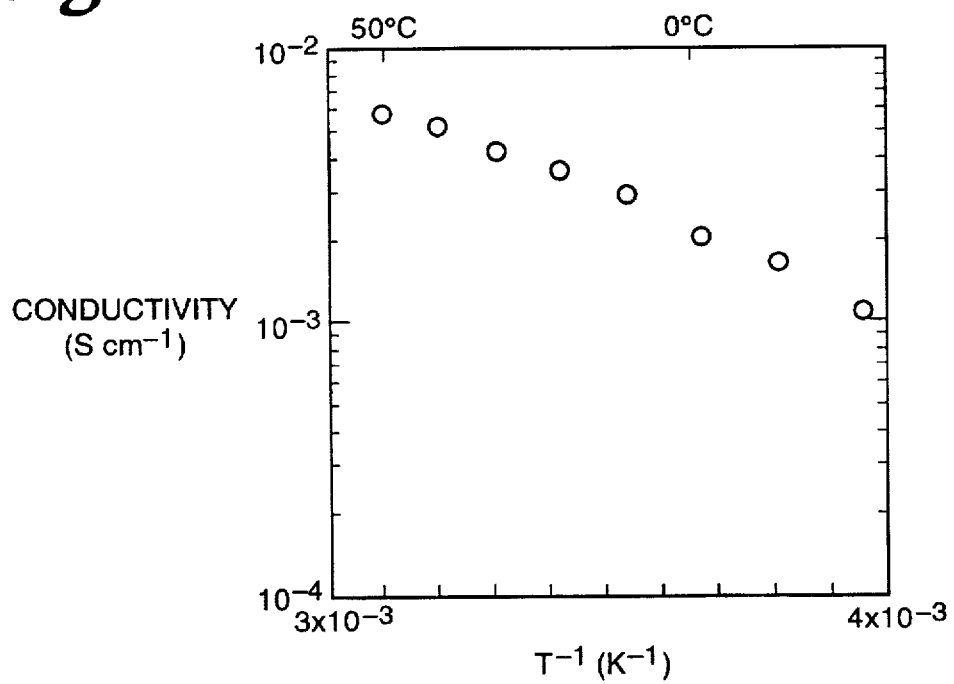
FIG. 5 is an Arrhenius plot of the conductivity of the ionically conducting polymer gel electrolyte as a function of temperature.

An illustrative polymer gel was prepared by heating 3.7 wt % poly(acrylonitrile) as a gelling agent having a molecular weight of about 150,000 g/mol in a propylene carbonate solvent containing 0.25M tetrabutylammonium tetrafluoroborate salt (Sachem electrometric grade prepared by dehydration at 130° C. under dynamic vacuum for 48 hours) at 141° C. FIG. 5 shows the conductivity of the resulting gel as a function of temperature, wherein the abscissa is the reciprocal of temperature ($K^{-1}$), and the ordinate is conductivity (S/cm). The conductivity of the gel was essentially similar to that of liquid phase organic electrolytes and remained relatively high even at low temperatures. In contrast, the conductivity of single phase solid electrolytes, such as poly(ethylene oxide)-based electrolytes, decreased rapidly below the glass transition temperatures of the polymer.

(3) Preparation of an all-polymer battery

An all-polymer battery incorporating poly(3(3,4,5-trifluorophenyl)thiophene) as the anode and poly(3(3,5-difluorophenyl)thiophene) as the cathode, and the electrolyte of Example (2) was prepared as follows.

The polymeric electrodes for the all-polymer battery were electrochemically deposited from a solution of 0.1M of monomers to a total charge of 1.5 $C/cm^2$ (corresponding to 1.4 $mg/cm^2$ of poly(3(3,4,5-trifluorophenyl)thiophene) and 1.2 $mg/cm^2$ of poly(3,(3,5-difluorophenyl)thiophene). As a result, 95 $mC/cm^2$ of each polymer were deposited on a 25 µm thick graphite-coated TEFLON film resulting in thin and flexible electrodes each having a thickness and surface areas of about 10 µm and about 6.7 $cm^2$, respectively, with no metallic components. Under these deposition conditions the films were smooth and continuous with a nodular structure characteristic of many conducting polymers.

Electrochemical cells were then assembled in the neutralized state by shifting the potential of the polymeric electrode films into a region such that the polymeric electrode films were undoped and storing the polymeric electrode films in anhydrous propylene carbonate.

Figure 4:
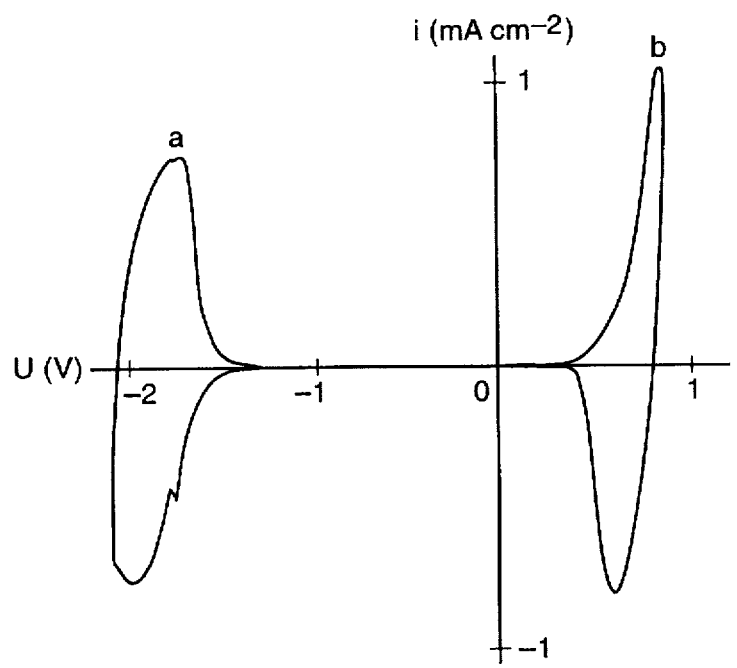
FIG. 4 is a voltammogram illustrating the electrochemical properties exhibited from n-doping/undoping poly(3(3,4,5-trifluorophenyl)thiophene) and p-doping/undoping poly(3(3,5-difluorophenyl)thiophene) in 0.25M tetrabutylammonium tetrafluoroborate in propylene carbonate.

FIG. 4 shows cyclic voltammogram for n-doping/undoping of the poly(3(3,4,5-trifluorophenyl)thiophene) and p-doping/undoping of poly(3(3,5 difluorophenyl)thiophene) in a liquid electrolyte. The voltammogram illustrates the highly reversible doping process associated with these polymers. In acquiring the voltammogram, a scan rate of 25 mV/s was used to ensure that the films were fully doped and undoped during successive scans. All potentials are referenced to the Ag+/Ag redox couple in the same solution.

The relevant properties of the two polymers are summarized in the Table II:

TABLE II

|  | poly (3,5-difluorophenyl thiophene (p-doping: cathode) | poly (3,4,5-trifluorophenyl thiophene (n-doping: anode) |
| --- | --- | --- |
| doping level (electrons/monomer unit) | 0.21 | 0.26 |
| charge density (mAh/g) | 29.0 | 32.1 |
| average stability per cycle (%) | 99.92 | 99.53 |
| electropolymerization potential (V) | 1.15 | 1.15 |
| potential of fully doped state | 0.88 | −2.08 |
| potential of the neutralization peak | 0.56 | −1.79 |

The electrode materials of these examples exhibited good charge capacity and cyclibility. The potential difference between the fully p-doped and fully n-doped states of the two polymers is 2.96 V, corresponding to the maximum expected open circuit voltage of a fully charged cell constructed from these two materials. From the potential difference between the current peaks associated with neutralization of both the n-doped and p-doped states, the plateau voltage during discharge is expected to be about 2.35 V. The average charge capacities, based on the mass of the dry, neutralized polymer, were 32.1 mAh/g for the poly(3(3,4,5-trifluorophenyl)thiophene) and 29.0 mAh/g for the poly(3(3,5-difluorophenyl)thiophene). The cycling efficiency for the poly(3(3,4,5-trifluorophenylthiophene) was 99.53% per cycle averaged over 100 cycles. This corresponds to a total loss of capacity of 47% over 100 cycles and is significantly better than other n-doped polymers. The loss of capacity represents an extreme case since the films would not be expected to be completely charged and discharged in normal battery usage.

Figure 6A:
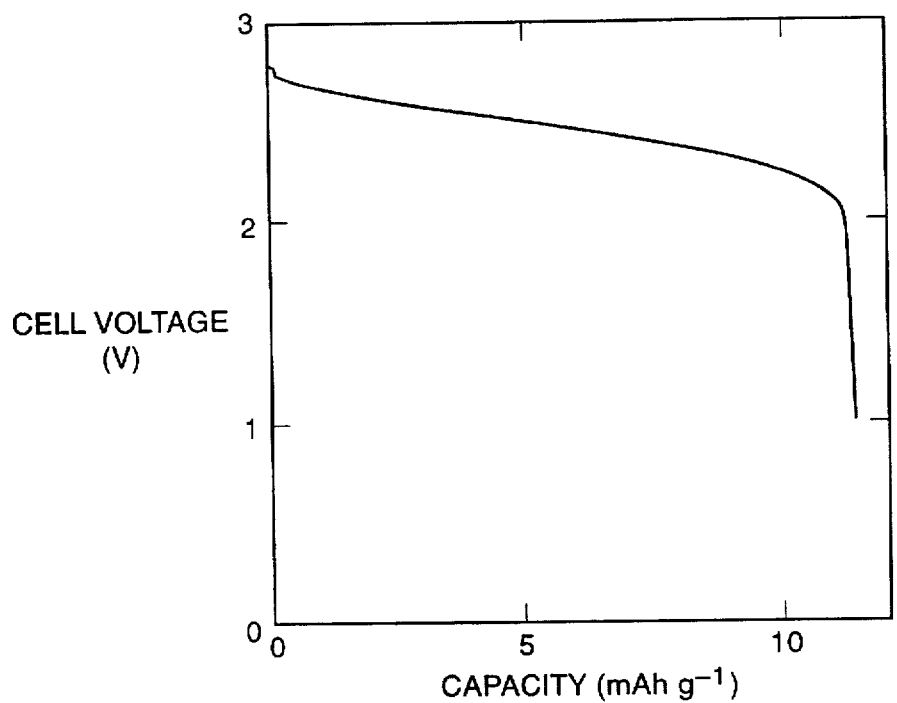
FIG. 6 is graph representing voltage versus capacity discharge curve for an electrochemical storage cell in accordance with the embodiment of the present invention depicted in FIG. 1.
Figure 6B:
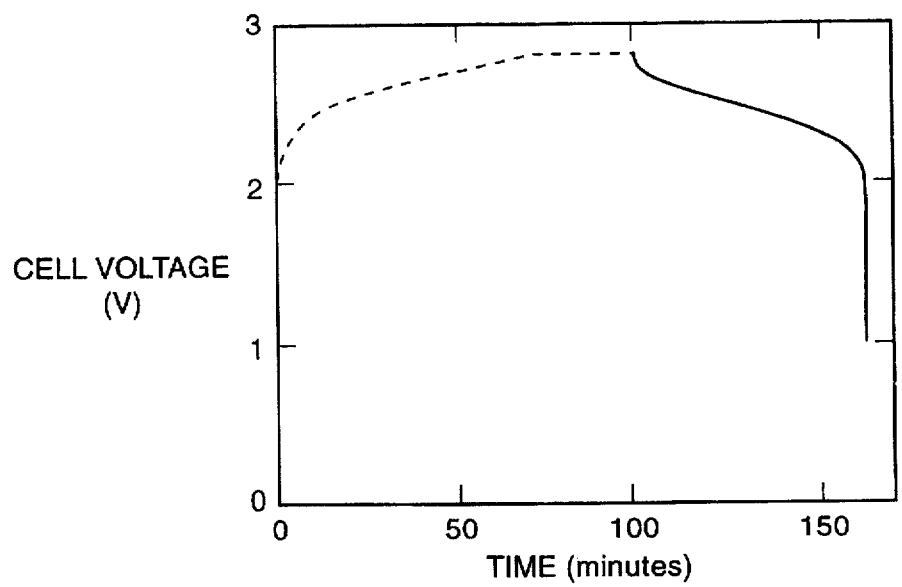

These cells exhibited specific charge capacities between 9.5 to 11.5 mAh/g and energy densities of 22.8 to 27.6 mWh/g, based on the total active mass of the anode and cathode. The average cycling efficiency, calculated from the charge retained after a maximum of 150 cycles, was 99.1%. As shown in FIG. 6, the discharge curve exhibits an extended region at voltages between 2.2 and 2.7 V, consistent with the value expected from the cyclic voltammograms of the two polymers. These operating voltages are higher than for traditional aqueous batteries and are comparable to lithium battery systems such as Li/MoS$_2$ and Li/TiS$_2$ as well as some lithium intercalation systems. Although the specific charge capacities reported here are not as large as for lithium batteries, the cells nonetheless are of practical interest given the good cyclibility.

The above-described performance of the electrochemical cells was characterized by recording multiple charge/discharge cycles of several sample cells. The procedure for charging and discharging was as follows. The cells were charged at constant current of 200 μA up to 2.8 V and held at this voltage until the current dropped to 40 μA. At this point, the cells were discharged at a constant current of 200 μA until the cell voltage dropped to 1 V. This procedure corresponds to almost 100% depth of discharge. The inset of FIG. 6 shows both the relations between charge time and voltage (dotted line) and discharge time and voltage for batteries prepared in accordance with this Example (solid line).

Although the present invention has been described in detail with reference to its presently preferred embodiments, it will be understood by those of ordinary skill in the art that various modifications and improvements to the present invention are believed to be apparent to one skilled in the art. The embodiments were chosen and described in order to explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An electrochemical storage cell comprising as at least one electrode at least one electrically conductive polymer, said at least one electrically conductive polymer comprising at least one fluorophenyl polythiophene selected from the group consisting of poly(3(2-fluorophenyl) thiophene), poly(3(3-fluorophenyl) thiophene), poly(3(2,4-difluorophenyl) thiophene), poly(3(3,4-difluorophenyl) thiophene), poly(3(3,5-difluorophenyl) thiophene), and poly(3(3,4,5-trifluorophenyl)thiophene).

2. An electrochemical storage cell according to claim 1, wherein said at least one electrode is an anode.

3. An electrochemical storage cell according to claim 2, wherein said anode is formulated from poly(3(3,4,5 trifluorophenyl)thiophene.

4. An electrochemical storage cell according to claim 1, wherein said at least one electrode is a cathode formulated from poly(3(3,5-difluorophenyl)thiophene).

5. An electrochemical storage cell according to claim 1, wherein said at least one polymer of said at least one electrode is formulated by electropolymerization.

6. An electrochemical storage cell according to claim 1, wherein said at least one polymer of said at least one electrode is formulated by chemical polymerization.

7. An electrode storage cell according to claim 1, further comprising a polymer gel electrolyte film.

8. An electrode storage cell according to claim 7, wherein said polymer gel electrolyte film contains a tetrabutylammonium tetrafluoroborate salt in a propylene carbonate solvent.

9. An electrode storage cell according to claim 1, wherein said at least one polymer is a homopolymer.

10. An electrochemical storage cell comprising a polymeric anode and a polymeric cathode, said anode and said cathode each comprising at least one fluorophenyl polythiophene selected from the group consisting of poly(3(2-fluorophenyl) thiophene), poly(3(3 fluorophenyl) thiophene), poly(3(2,4-difluorophenyl) thiophene), poly(3 (3,4-difluorophenyl) thiophene), poly(3(3,5-difluorophenyl) thiophene), and poly(3(3,4,5-trifluorophenyl)thiophene).

11. An electrochemical storage cell according to claim 10, wherein said anode is formulated from poly(3(3,4,5 trifluorophenyl)thiophene.

12. An electrochemical storage cell according to claim 10, wherein said anode is formulated from poly(3(3,5-difluorophenyl)thiophene).

13. An electrochemical storage cell according to claim 11, wherein said cathode is formulated from poly(3(3,5-difluorophenyl)thiophene).

14. An electrochemical storage cell according to claim 10, wherein said anode and said cathode each are formulated by electropolymerization.

15. An electrochemical storage cell according to claim 14, further comprising a polymer gel electrolyte film.

16. An electrochemical storage cell according to claim 10, wherein said polymer gel electrolyte film contains a tetrabutylammonium tetrafluoroborate salt in a propylene carbonate solvent.

17. An electrode storage cell according to claim 10, wherein said at least one polymer is a homopolymer.

18. An battery containing the electrochemical storage cell of claim 1.

19. An battery containing the electrochemical storage cell of claim 10.

20. An electrode comprising at least one fluorophenyl polythiophene selected from the group consisting of poly (3(2-fluorophenyl) thiophene) , poly((3-fluorophenyl) thiophene), poly(3(2,4-difluorophenyl) thiophene), poly(3 (3,4-difluorophenyl) thiophene), poly(3(3,5-difluorophenyl) thiophene), and poly(3(3,4,5-trifluorophenyl) thiophene).

21. An electrode according to claim 20, wherein said electrode is an anode.

22. An electrode according to claim 20, wherein said fluorophenyl polythiophene is a homopolymer.

* * * * *

UNITED STATES PATENT AND TRADEMARK OFFICE
CERTIFICATE OF CORRECTION

PATENT NO. : 5,733,683
DATED : March 31, 1998
INVENTOR(S) : Searson, et al.

It is certified that error appears in the above-indentified patent and that said Letters Patent is hereby corrected as shown below:

At column 1, line 4, insert:

--ORIGINATION OF THE INVENTION

The work that resulted in the subject invention was supported by Grant No. FA8002-96-C-0301, with the United States Department of the Air Force as the sponsoring government agency.--

Signed and Sealed this

Fourth Day of August, 1998

Attest:

Attesting Officer

BRUCE LEHMAN

Commissioner of Patents and Trademarks